(12) United States Patent
Bieser et al.

(10) Patent No.: US 8,153,730 B2
(45) Date of Patent: Apr. 10, 2012

(54) POLYOLEFIN BLENDS USED AS MASTERBATCH CONCENTRATES

(75) Inventors: John O. Bieser, Houston, TX (US); Fengkui Li, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 1486 days.

(21) Appl. No.: 11/492,379

(22) Filed: Jul. 25, 2006

(65) Prior Publication Data

US 2006/0264574 A1   Nov. 23, 2006

Related U.S. Application Data

(63) Continuation-in-part of application No. 10/996,744, filed on Nov. 24, 2004, now abandoned.

(60) Provisional application No. 60/525,173, filed on Nov. 26, 2003.

(51) Int. Cl.
  *C08L 23/00* (2006.01)
  *C08F 4/00* (2006.01)

(52) U.S. Cl. ...... 525/240; 525/262; 525/309; 525/330.3

(58) Field of Classification Search .................. 525/240, 525/262, 309, 330.3
See application file for complete search history.

(56) References Cited

U.S. PATENT DOCUMENTS

| | | | |
|---|---|---|---|
| 5,912,076 A | 6/1999 | Wang et al. | |
| 6,111,013 A | 8/2000 | Simpson et al. | |
| 6,262,177 B1 * | 7/2001 | Bergstrom et al. | 525/191 |

* cited by examiner

*Primary Examiner* — Milton I Cano
*Assistant Examiner* — Gennadiy Mesh

(57) ABSTRACT

Polyolefin blends and processes for forming polyolefin blends are described. The process generally includes forming of polyolefin blends with acrylic monomer system comprising: providing a polyolefin comprising a first portion and a second portion; providing a concentrated monomer system comprising an acrylic monomers and the first portion of the polyolefin, wherein the concentrated monomer system comprises the acrylic monomers at a first concentration and a first portion of the polyolefin; and blending the concentrated monomer system with the a second portion of the polyolefin to form a modified polyolefin, wherein the modified polyolefin comprises a second concentration of acrylic monomers that is less than the first concentration. Described blends can be used as masterbatch concentrates.

16 Claims, 1 Drawing Sheet

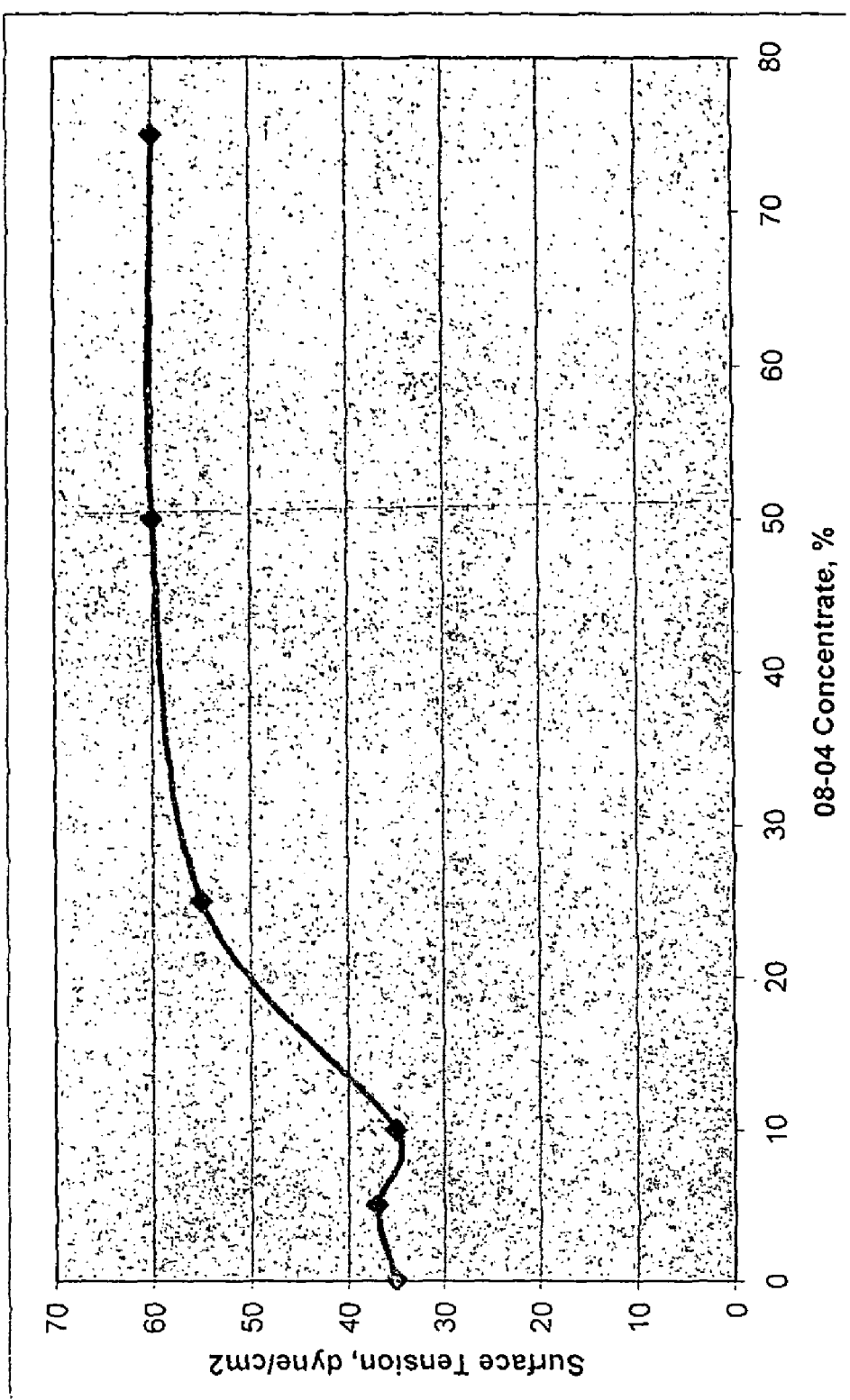

POLYOLEFIN BLENDS USED AS MASTERBATCH CONCENTRATES

CROSS-REFERENCE TO RELATED APPLICATIONS

This application claims the benefit of U.S. patent application Ser. No. 10/996,744, filed Nov. 24, 2004, now abandoned, which claims the benefit of U.S. Provisional Patent Application Ser. No. 60/525,173, filed Nov. 26, 2003.

FIELD

Embodiments of the present invention generally relate to polyolefin blends and articles formed therefrom.

BACKGROUND

As reflected in the patent literature, polyolefins have been widely used in a variety of applications due to their low cost and ease of manipulation.

However, certain properties such as paintability, printability, dimensional stability, biodegradability and resistance to various solvents expose deficiencies that may exist in some products manufactured from polyolefins.

For example, it is often desirable to be able to apply ink to a polyolefin film in a printing process (i.e., printability). Water based inking systems generally require a substrate surface tension of greater than about 36 dyne/cm$^2$, more typically in the range of from about 42 to about 45 dyne/cm$^2$ to provide acceptable adhesion and wetout. However, conventional polyolefin films may display a surface tension that is less than the surface tension required for adequate printability.

Therefore, a need exists to develop polyolefins having enhanced printability, along with other properties.

SUMMARY

Embodiments of the present invention include processes for forming polyolefin blends. Such processes generally include providing a polyolefin, providing a concentrated monomer system including a first monomer and a first portion of the polyolefin and blending the concentrated monomer system with a second portion of the polyolefin to form a modified polyolefin.

In one embodiment, the process includes providing a polyolefin, providing a concentrated monomer system including an acrylic monomer at a first concentration and a first portion of the polyolefin and blending the concentrated monomer system with a second portion of the polyolefin to form a modified polyolefin, wherein the modified polyolefin includes a second concentration of acrylic monomer that is less than the first concentration.

Embodiments further include polyolefin blends. The blends generally include a polyolefin and a concentrated monomer system including the polyolefin and an acrylic monomer.

BRIEF DESCRIPTION OF DRAWINGS

FIG. 1 illustrates a graphical representation of the effect of the amount of concentrate on surface tension in a 2 mil film.

DETAILED DESCRIPTION

Introduction and Definitions

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Catalyst Systems

Catalyst systems useful for polymerizing olefin monomers include any catalyst system known to one skilled in the art. For example, the catalyst system may include metallocene catalyst systems, single site catalyst systems, Ziegler-Natta catalyst systems or combinations thereof, for example.

Polymerization Processes

As indicated elsewhere herein, catalyst systems are used to form polyolefin compositions. Once the catalyst system is prepared, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. Other monomers include ethylenically unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 45 bar and a temperature of from about 38° C. to about 121° C., for example. Reaction heat may be removed through the loop wall via any method known to one skilled in the art, such as via a double-jacketed pipe.

Alternatively, other types of polymerization processes may be used, such stirred reactors in series, parallel or combinations thereof, for example. Upon removal from the reactor, the polymer may be passed to a polymer recovery system for further processing, such as addition of additives and/or extrusion, for example.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene (e.g., syndiotactic, atactic and isotactic) and polypropylene copolymers, for example.

Embodiments of the invention generally include blending one or more of the polymers with a monomer system to form a modified polyolefin.

The monomer system may include any monomer capable of resulting in a modified polyolefin having a discontinuous nanoparticulate dispersion. As used herein, the term "discontinuous nanoparticulate dispersion" refers to a monomer (e.g., dispersion or as discussed below, first monomer) disposed within a continuous polyolefin phase. In one embodiment, the monomer system includes a first monomer selected from monofunctional monomers, difunctional monomers, hexafunctional monomers, tetrafunctional monomers, pentafunctional monomers and trifunctional monomers, such as those that are commercially available from Sartomer, Inc., Exton, Pa.

In one embodiment, the first monomer may include acrylic monomers. The acrylic monomers may include 2-(2-ethoxyethoxy) ethyl acrylate, diethylene glycol diacrylate, tridecyl acrylate, tridecylacrylate hexanediol diacrylate, lauryl acrylate, alkoxylated lauryl acrylate, caprolactone acrylate, 1,6-hexanediol diacrylate, trimethylolpropane triacrylate, polyethylene glycol diacrylate, neopentane diol diacrylate, polyethylene glycol diacrylate and combinations thereof, for example.

In addition to the acrylic monomer, the monomer system may further include another monomer. The other monomer may include ethylenically unsaturated monomers, such as styrene, for example. In one embodiment, the monomer system includes hydrophilic monomers. As used herein, the term "hydrophilic" refers to monomers having oxygen or nitrogen atoms in their backbone structure. The hydrophilic monomers may include 2-(2-ethoxyethoxy) ethyl acrylate, tetrahydrofuryl acrylate, polyethylene glycol (200) diacrylate, tetraethylene glycol diacrylate, triethylene glycol diacrylate, tripropylene glycol diacrylate and polyethylene glycol (400) diacrylate, for example.

The average particle size of the dispersion may be from about 2 nm to about 500 nm, or from about 2 nm to about 400 nm or from about 2 nm to about 300 nm, for example. The dispersion may have a particle size distribution wherein at least about 50%, or at least about 60%, or at least about 70%, or at least about 80% or at least about 90% of the particles have a maximum particle size of 50 nm, for example.

In one or more embodiments, the monomer system includes a concentrated monomer system. As used herein, the term "concentrated monomer system" refers to a system that includes the first monomer at a first concentration blended with a first portion of a polyolefin. The system is then blended with a second portion of the polyolefin, resulting in a modified polyolefin having a second concentration of acrylic monomer, the second concentration being lower than the first concentration.

For example, the monomer system may include from about 10 wt. % to about 90 wt. %, or from about 15 wt. % to about 85 wt. %, or from about 25 wt. % to about 85 wt. %, or from about 30 wt. % to about 80 wt. % or from about 35 wt. % to about 75 wt. % acrylic monomer, for example.

In addition, the modified polyolefin may include from about 5 wt. % to about 45 wt. %, or from about 5 wt. % to about 40 wt. %, or from about 5 wt. % to about 25 wt. % or from about 10 wt. % to about 20 wt. % monomer system, for example.

As used herein, the term "blending" generally refers to introducing the polyolefin and the monomer system into a system capable of forming a separate, dispersed nanoparticulate polymer phase in a continuous polyolefin phase. For example, the blending may be accomplished introducing the polyolefin and monomer system into a batch mixer, continuous mixer, single screw extruder or twin screw extruder, for example, to form a homogeneous mixture or solution, introducing a free radical catalyst and providing pressure and temperature conditions so as to polymerize the monomer system and form a separate, dispersed nanoparticulate polymer phase in a continuous polyolefin phase (modified polyolefin).

The blending process may further include contacting the polyolefin, the monomer system or a combination thereof with an initiator. Such contact may occur as is known to one skilled in the art. The initiator may include any initiator known to one skilled in the art, such as a free radical initiator. The free radical initiator may include peroxides, for example.

Unexpectedly, the modified polyolefin flows as if it was a single phase polyolefin. Further, the modified polyolefin exhibits an increased surface tension without a large change in the polyolefin properties (e.g., small monomer system concentration provides minimal effect on polyolefin while unexpectedly resulting in beneficial change in surface tension.) For example, the modified polyolefin may exhibit a surface tension of from about 35 dyne/cm$^2$ to about 70 dyne/cm$^2$, or from about 40 dyne/cm$^2$ to about 65 dyne/cm$^2$ or from about 45 dyne/cm$^2$ to about 60 dyne/cm$^2$, for example.

Product Application

The modified polyolefins formed herein are useful in applications known to one skilled in the art, such as forming operations (e.g., film, sheet, pipe and fiber extrusion and co-extrusion as well as blow molding, injection molding and rotary molding). Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include melt spinning, solution spinning and melt blown fiber operations for use in woven or non-woven form to make filters, diaper fabrics, medical garments and geotextiles, for example. Extruded articles include medical tubing, wire and cable coatings, geomembranes and pond liners, for example. Molded articles include single and multi-layered constructions in the form of bottles, tanks, large hollow articles, rigid food containers and toys, for example.

In particular, the modified polyolefins formed herein can be used to form a wide variety of materials and articles having improved paintability, printability, biodegradability, wettability, tensile strength, impact strength, modulus, vapor transmission, thermoform processability, compatibility with fillers, compatibility in polymer blends, fire resistance, abrasion resistance, transparency, conductivity, and/or resistance to photodegredation as compared to polyolefins having a continuous polyolefin phase.

EXAMPLES

Samples of modified polyolefins were prepared.

As used herein, the "monomer system" was a three component blend of alkoxylated lauryl acrylate, 2(2-ethoxyethoxy) ethylacrylate and ethoxylated trimethylpropane triacrylate, in a weight ratio of 40:30:30 respectively.

As used herein, Lupersol® 101 was used as the crosslinking agent.

All samples were prepared by reactively extruding a metallocene random copolymer (EOD 02-15, commercially available from TOTAL PETROCHEMICALS USA, Houston, Tex.) with the acrylate in a Leistritz Micro-27 twin-screw extruder. The extruder temperature profile conditions are shown in Table 1.

TABLE 1

| | ZONE | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Temperature Set Point (° F.) | 410 | 410 | 405 | 400 | 395 | 390 | 385 | 385 | 380 | 380 | 380 | 380 |

A series of formulations were produced, the compositions of which are provided in Table 2.

TABLE 2

| | Formulation, wt % | | | | Processing Conditions | |
|---|---|---|---|---|---|---|
| Sample # | Polyolefin | Monomer System | Peroxide | Peroxide % of monomer | Rate lb/hr | Extruder Speed rpm |
| 1 | 76.2 | 23.5 | 0.292 | 1.24 | 32 | 100 |
| 2 | 64.9 | 34.5 | 0.574 | 1.66 | 37.5 | 200 |
| 3 | 59.8 | 39.6 | 0.606 | 1.66 | 32.5 | 200 |
| 4 | 56.5 | 42.8 | 0.712 | 1.66 | 30 | 200 |

Samples 1 and 2 were used in an injection molding process. The properties of the molded product are provided in Table 3.

TABLE 3

| | | | | Tensile Properties | | | | |
|---|---|---|---|---|---|---|---|---|
| Sample | MFR g/10 min | Flex Modulus Kpsi | Izod Notched Impact ft–lb/in | Tensile Modulus | Tensile Yield psi | Elongation Yield % | Tensile Break psi | Elongation Break % |
| 1 | | 46 | | 61 | 1780 | 13 | 2050 | 343 |
| 2 | | 42 | | 54 | 1405 | 10 | 1135 | 148 |

Sample 4 was evaluated for use as a "wetting agent", or surface tension modifier, in blending experiments with polyolefins. Varying amounts of the concentrate were dry-blended with polyolefin, and 2 mil films produced on a cast film production line. The surface tension of each film was measured and the results are shown in FIG. 1.

Unexpectedly, the embodiments described herein result in a modified polyolefin having a low concentration of monomer system while still exhibiting a beneficial increase in surface tension (e.g., concentrations greater than 30% result in surface tensions greater than 50 dyne/cm$^2$.)

While the foregoing is directed to embodiments of the present invention, other and further embodiments of the invention may be devised without departing from the basic scope thereof and the scope thereof is determined by the claims that follow.

What is claimed is:

1. A process of forming polyolefin blends comprising:
providing a polyolefin comprising a first portion and a second portion;
providing a concentrated monomer system comprising an acrylic monomer and the first portion of the polyolefin, wherein the concentrated monomer system comprises the acrylic monomer at a first concentration; and
blending the concentrated monomer system with the second portion of the polyolefin to form a modified polyolefin, wherein the modified polyolefin comprises a second concentration of acrylic monomer that is less than the first concentration.

2. The process of claim 1, wherein the first concentration is from about 10 wt. % to about 85 wt. %.

3. The process of claim 1, wherein the second concentration is from about 5 wt. % to about 40 wt. %.

4. The process of claim 1, wherein the polyolefin comprises polypropylene.

5. The process of claim 1, wherein the second concentration is from about 5 wt. % to about 25 wt. %.

6. The process of claim 1, wherein the acrylic monomer is selected from 2-(2-ethoxyethoxy) ethyl acrylate, diethylene glycol diacrylate, tridecyl acrylate, tridecylacrylate hexanediol diacrylate, lauryl acrylate, alkoxylated lauryl acrylate, caprolactone acrylate, 1,6-hexanediol diacrylate, trimethylolpropane triacrylate, polyethylene glycol diacrylate, neopentane diol diacrylate, polyethylene glycol diacrylate and combinations thereof.

7. The process of claim 1, wherein the first concentration is from about 35 wt. % to about 75 wt. %.

8. The process of claim 1, wherein the monomer system comprises hydrophilic monomers.

9. The process of claim 1, wherein the modified polyolefin exhibits a surface tension of from about 35 dyne/cm$^2$ to about 70 dyne/cm$^2$.

10. The process of claim 1, wherein the modified polyolefin exhibits a surface tension of from about 45 dyne/cm$^2$ to about 60 dyne/cm$^2$.

11. The process of claim 1, wherein the modified polyolefin exhibits a surface tension that is greater than a surface tension of a polyolefin formed with a monomer system in the absence of the concentrated monomer system.

12. A process of forming a modified polyolefin comprising:
providing a polyolefin comprising a first portion and a second portion;
providing a concentrated monomer system comprising a first monomer and the first portion of the polyolefin, wherein the concentrated monomer system comprises the acrylic monomer; and
blending the concentrated monomer system with the second portion of the polyolefin to form a modified polyolefin.

13. The process of claim 12, wherein the first monomer is selected from monofunctional monomers, difunctional monomers, hexafunctional monomers, tetrafunctional monomers, pentafunctional monomers, trifunctional monomers and combinations thereof.

14. The process of claim 13, wherein the polyolefin comprises polypropylene.

15. The process of claim 12, wherein the first monomer is selected from monofunctional monomers, difunctional monomers, trifunctional monomers or combinations thereof.

16. The process of claim 15, wherein the first monomer comprises an acrylate monomer.

* * * * *